US012568387B2

(12) United States Patent
Mitchell et al.

(10) Patent No.: US 12,568,387 B2
(45) Date of Patent: *Mar. 3, 2026

(54) TARGETED MESSAGE VALIDATION FOR MOBILE DEVICES

(71) Applicant: T-MOBILE USA, INC., Bellevue, WA (US)

(72) Inventors: Michael Mitchell, North Bend, WA (US); Peter Myron, Fall City, WA (US); Evan Fitzpatrick, Bellevue, WA (US); Sarvesh Kaushal, Bellevue, WA (US); Rohit Iyer, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 490 days.

This patent is subject to a terminal disclaimer.

(21) Appl. No.: 18/105,028

(22) Filed: Feb. 2, 2023

(65) Prior Publication Data

US 2023/0180030 A1     Jun. 8, 2023

Related U.S. Application Data

(63) Continuation of application No. 17/085,387, filed on Oct. 30, 2020, now Pat. No. 11,601,828.

(51) Int. Cl.
*H04W 24/06* (2009.01)
*H04W 4/12* (2009.01)
*H04W 4/23* (2018.01)

(52) U.S. Cl.
CPC ............. *H04W 24/06* (2013.01); *H04W 4/12* (2013.01); *H04W 4/23* (2018.02)

(58) Field of Classification Search
CPC ......... H04W 24/06; H04W 4/12; H04W 4/23; H04W 4/06; H04W 4/08; H04W 4/14; H04W 4/20; H04W 4/203; H04W 4/21
See application file for complete search history.

(56) References Cited

U.S. PATENT DOCUMENTS

| | | | | |
|---|---|---|---|---|
| 2004/0258063 | A1* | 12/2004 | Raith ................... | H04W 88/184 |
| | | | | 370/466 |
| 2008/0172285 | A1* | 7/2008 | Hurowitz ............... | G06Q 30/02 |
| | | | | 725/23 |
| 2009/0258630 | A1* | 10/2009 | Purohit ................. | H04M 15/68 |
| | | | | 455/406 |
| 2019/0139077 | A1* | 5/2019 | Thomas ............. | G06Q 30/0242 |

(Continued)

*Primary Examiner* — Md K Talukder
(74) *Attorney, Agent, or Firm* — Lee & Hayes, P.C.

(57) ABSTRACT

Systems and methods are provided for using automated mobile computing device testing to ensure that a given targeted message is actually appearing in an intended manner for various types of intended recipients. The intended content or format of a target message to be presented by each of a plurality of mobile computing devices may be based on characteristics of each device. The targeted message may be sent to each device, and an indication of the actual content and/or format of the targeted message as presented by each device may be received and compared to the intended content or format of the targeted message for each device. Errors associated with the targeted message may be detected based on any discrepancies between the intended content and/or format of the targeted message for each device and the actual content or format of the targeted message as presented by each device.

20 Claims, 4 Drawing Sheets

(56)  References Cited

U.S. PATENT DOCUMENTS

2019/0140996  A1*    5/2019  Silberstein ............. G06N 20/00
2019/0387381  A1*   12/2019  Fritz ................... H04W 68/005
2022/0141683  A1*    5/2022  Mitchell ................ H04W 4/23
                                                               455/67.11
2023/0180030  A1*    6/2023  Mitchell ................ H04W 4/23
                                                               455/67.11

* cited by examiner

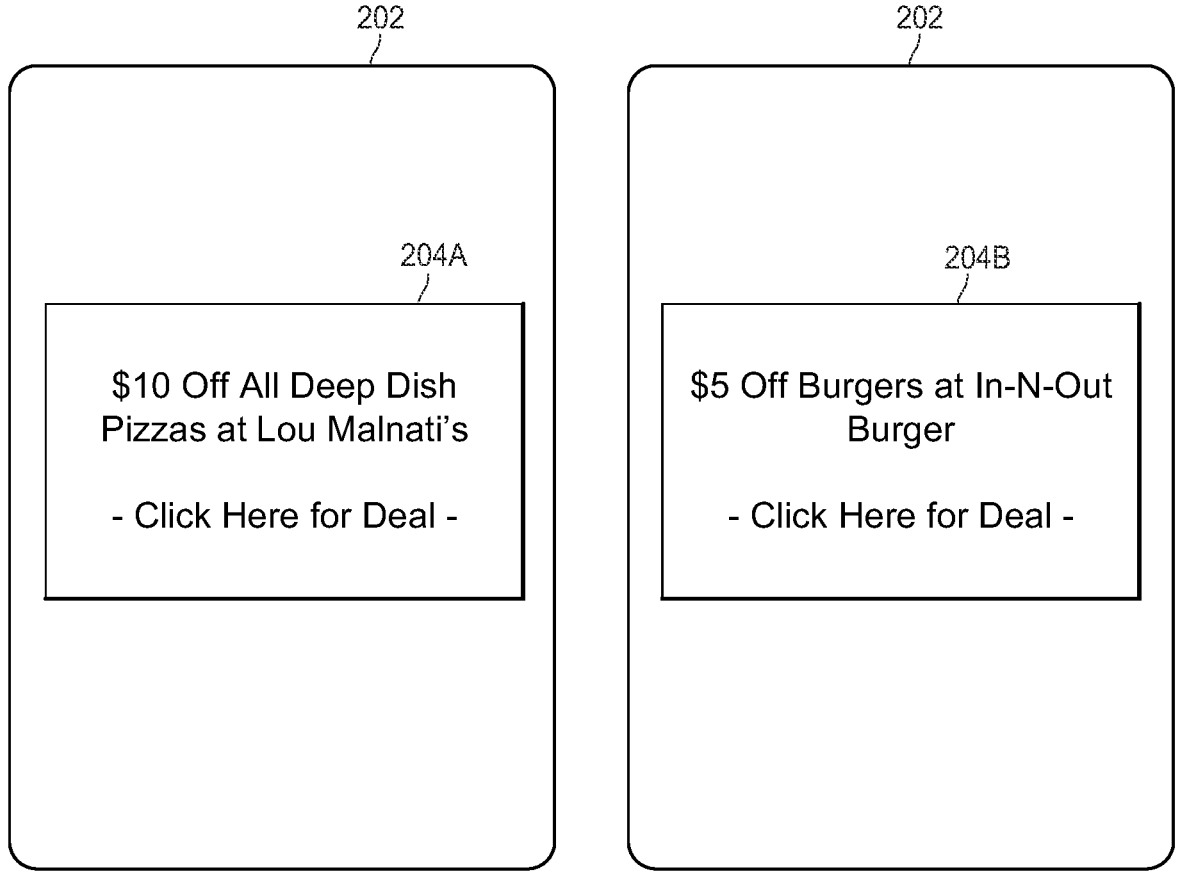
FIG. 2A          FIG. 2B

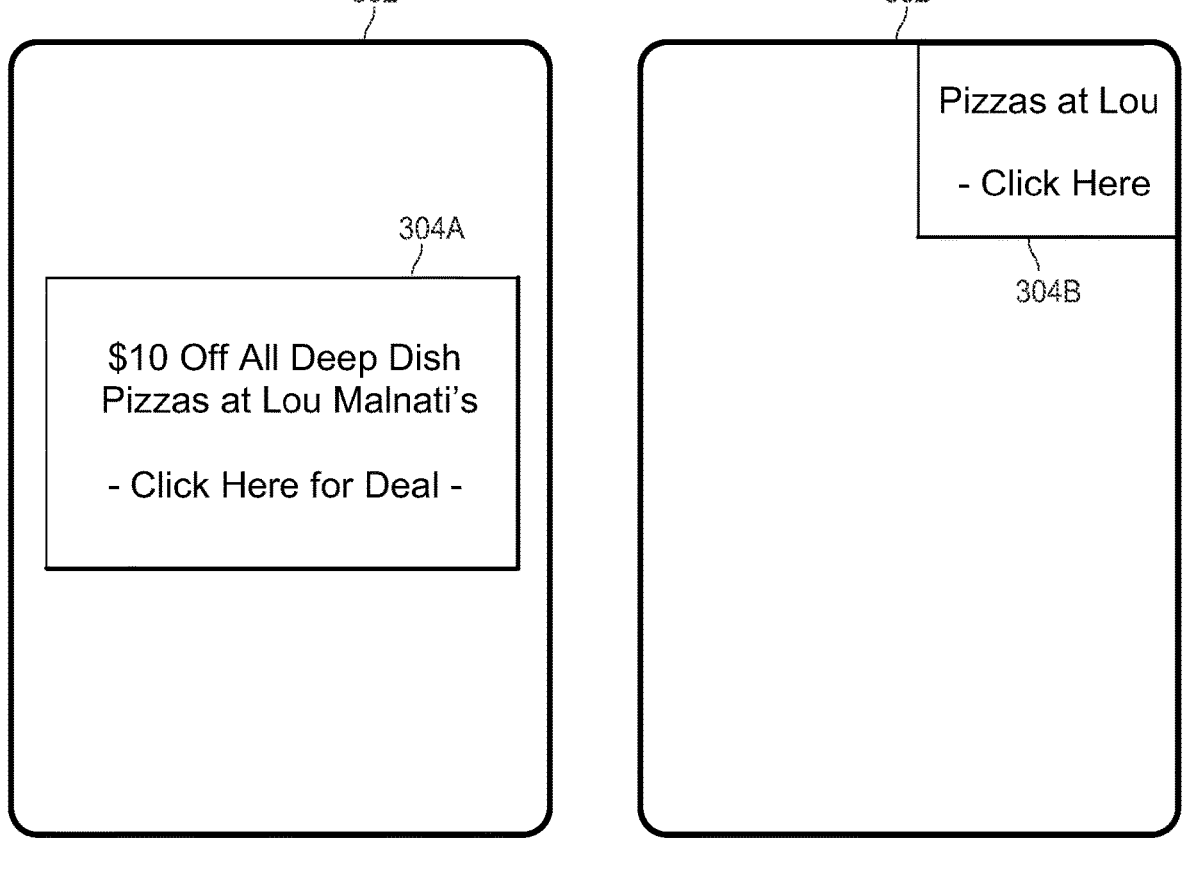
FIG. 3A                FIG. 3B

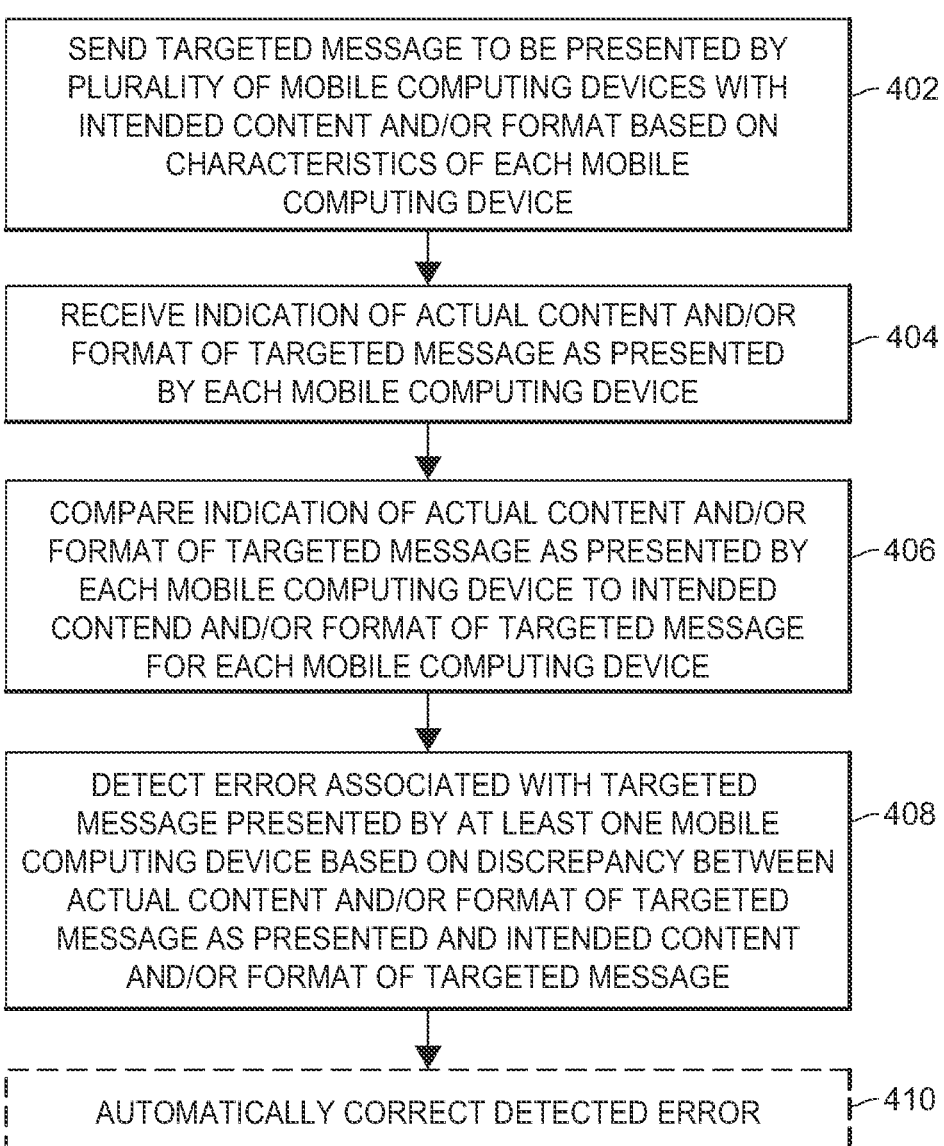

400

| SEND TARGETED MESSAGE TO BE PRESENTED BY PLURALITY OF MOBILE COMPUTING DEVICES WITH INTENDED CONTENT AND/OR FORMAT BASED ON CHARACTERISTICS OF EACH MOBILE COMPUTING DEVICE | ⟋ 402 |

| RECEIVE INDICATION OF ACTUAL CONTENT AND/OR FORMAT OF TARGETED MESSAGE AS PRESENTED BY EACH MOBILE COMPUTING DEVICE | ⟋ 404 |

| COMPARE INDICATION OF ACTUAL CONTENT AND/OR FORMAT OF TARGETED MESSAGE AS PRESENTED BY EACH MOBILE COMPUTING DEVICE TO INTENDED CONTEND AND/OR FORMAT OF TARGETED MESSAGE FOR EACH MOBILE COMPUTING DEVICE | ⟋ 406 |

| DETECT ERROR ASSOCIATED WITH TARGETED MESSAGE PRESENTED BY AT LEAST ONE MOBILE COMPUTING DEVICE BASED ON DISCREPANCY BETWEEN ACTUAL CONTENT AND/OR FORMAT OF TARGETED MESSAGE AS PRESENTED AND INTENDED CONTENT AND/OR FORMAT OF TARGETED MESSAGE | ⟋ 408 |

| AUTOMATICALLY CORRECT DETECTED ERROR | ⟋ 410 |

FIG. 4

TARGETED MESSAGE VALIDATION FOR MOBILE DEVICES

CROSS-REFERENCE TO RELATED APPLICATIONS

The present application is a continuation of U.S. patent application Ser. No. 17/085,387, entitled "Targeted Message Validation for Mobile Devices," and filed Oct. 30, 2020, the entirety of which is incorporated by reference herein.

FIELD OF THE DISCLOSURE

The present disclosure generally relates to validating targeted messages sent to mobile computing devices and, more particularly, to using automated mobile computing device testing to ensure that a given targeted message is actually appearing in an intended manner for various types of intended recipients.

BACKGROUND

Targeted messages presented by mobile computing device applications may be tailored for specific intended recipients, based on factors such as the location of the mobile computing device through which the advertisement is to be presented, type of mobile computing device, the strength of the mobile computing device's internet connection, the size of the mobile computing device, and/or the settings of the mobile computing device, as well as known information associated with the user of the mobile computing device. Such targeted messages may vary in content, formatting, style, priority, or level of detail. Examples of such targeted messages may include targeted news alerts, emergency alerts, or advertisements. Although various techniques for generating such targeted messages are known, validation of receipt and presentation at user devices is currently inadequate.

SUMMARY

The present application provides systems and methods for using automated mobile computing device testing to ensure that a given targeted message is actually appearing in an intended manner for various types of intended recipients, so that the efficacy of the targeted message can be determined more accurately. For instance, an advertisement for a restaurant chain that only exists in a specific geographical region should only appear for users with mobile computing devices located in that geographical region. If this advertisement appears to users in another geographical region, these users may not click on the advertisement because it advertises something that they cannot purchase in their area. As another example, a targeted message optimized for a Samsung® mobile computing device should only appear for users using a Samsung® mobile computing device. If the targeted messages optimized for the Samsung® mobile computing device appears to users who use an Apple® device, these users may not respond to the targeted message because it may be improperly formatted.

The automated testing may involve configuring "synthetic" mobile computing devices of various types, such synthetic mobile computing devices being virtual instances of mobile computing devices with various settings and with various simulated locations, signal strengths, user types, etc., and pushing the intended targeted messages to each of the devices. The actual targeted message displayed on each of the devices may be compared to the intended targeted message for each of the devices to determine whether any of the devices are displaying an incorrect (or incorrectly-optimized) targeted message, and, if so, errors may be corrected so that each device displays correctly optimized targeted message based on device settings. Advantageously, when errors in advertisements displayed to different users are corrected, the efficacy of each targeted message (e.g., based on number or rate of clicks) may be more accurately measured.

In one aspect, a computer-implemented method is provided, the method comprising: sending a targeted message to be presented by a plurality of mobile computing devices, wherein one or more of an intended content or an intended format of the targeted message to be presented by each respective mobile computing device of the plurality of mobile computing devices are based on one or more characteristics associated with the respective mobile computing device; receiving an indication of the actual content and the actual format of the targeted message as presented by each of the plurality of mobile computing devices; comparing the indication of the actual content and the actual format of the targeted message as presented by each respective mobile computing device of the plurality of mobile computing devices to the intended content or the intended format of the targeted message based on the characteristics of each respective mobile computing device of the plurality of mobile computing devices; and detecting an error associated with the targeted message presented by at least one of the plurality of mobile computing devices based on a discrepancy between the intended content or the intended format of the targeted message to be presented by the at least one of the plurality of mobile computing devices and the actual content or the actual format of the targeted message as presented by the at least one of the plurality of mobile computing devices.

In another aspect, a system is provided, the system comprising: one or more processors; and a non-transitory program memory communicatively coupled to the one or more processors and storing executable instructions that, when executed by the one or more processors, cause the processors to: send a targeted message to be presented by a plurality of mobile computing devices, wherein one or more of an intended content or an intended format of the targeted message to be presented by each respective mobile computing device of the plurality of mobile computing devices are based on one or more characteristics associated with the respective mobile computing device; receive an indication of the actual content and the actual format of the targeted message as presented by each of the plurality of mobile computing devices; compare the indication of the actual content and the actual format of the targeted message as presented by each respective mobile computing device of the plurality of mobile computing devices to the intended content or the intended format of the targeted message based on the characteristics of each respective mobile computing device of the plurality of mobile computing devices; and detect an error associated with the targeted message presented by at least one of the plurality of mobile computing devices based on a discrepancy between the intended content or the intended format of the targeted message to be presented by the at least one of the plurality of mobile computing devices and the actual content or the actual format of the targeted message as presented by the at least one of the plurality of mobile computing devices.

In still another aspect, a non-transitory computer readable storage medium is provided, storing computer-readable instructions that, when executed by one or more processors, cause the one or more processors to: send a targeted message to be presented by a plurality of mobile computing devices, wherein one or more of an intended content or an intended format of the targeted message to be presented by each respective mobile computing device of the plurality of mobile computing devices are based on one or more characteristics associated with the respective mobile computing device; receive an indication of the actual content and the actual format of the targeted message as presented by each of the plurality of mobile computing devices; compare the indication of the actual content and the actual format of the targeted message as presented by each respective mobile computing device of the plurality of mobile computing devices to the intended content or the intended format of the targeted message based on the characteristics of each respective mobile computing device of the plurality of mobile computing devices; and detect an error associated with the targeted message presented by at least one of the plurality of mobile computing devices based on a discrepancy between the intended content or the intended format of the targeted message to be presented by the at least one of the plurality of mobile computing devices and the actual content or the actual format of the targeted message as presented by the at least one of the plurality of mobile computing devices.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

FIGS. 2A and 2B illustrate an exemplary comparison of intended content for a targeted message for a particular mobile computing device and actual content of a targeted message as presented by the mobile computing device, in accordance with some embodiments.

FIGS. 3A and 3B illustrate an exemplary comparison of an intended format for a targeted message for a particular mobile computing device and the actual format of the targeted message as presented by the mobile computing device, in accordance with some embodiments.

FIG. 4 illustrates a flow diagram of an exemplary method for using automated mobile computing device testing to ensure that a given targeted message is actually appearing in an intended manner for various types of intended recipients, in accordance with some embodiments.

DETAILED DESCRIPTION

Figure 1:
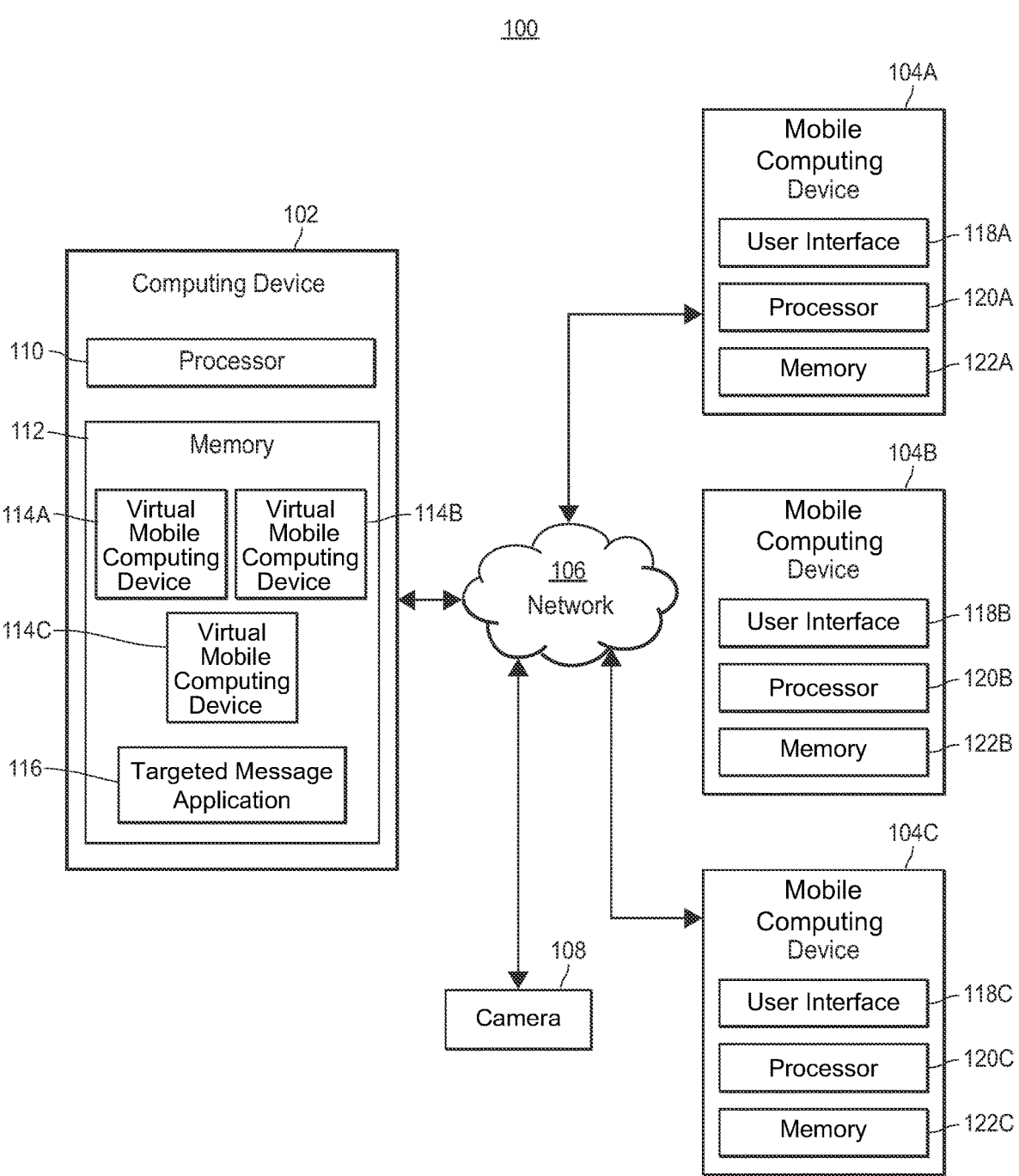
FIG. 1 illustrates a block diagram of an exemplary system for using automated mobile computing device testing to ensure that a given targeted message is actually appearing in an intended manner for various types of intended recipients, in accordance with some embodiments.

Referring now to the drawings, FIG. 1 illustrates a block diagram of an exemplary system 100 for using automated mobile computing device testing to ensure that a given targeted message is actually appearing in an intended manner for various types of intended recipients, in accordance with some embodiments. The high-level architecture illustrated in FIG. 1 may include both hardware and software applications, as well as various data communications channels for communicating data between the various hardware and software components, as is described below.

A computing device 102 may be configured to communicate with a plurality of physical mobile computing devices 104A, 104B, 104C (which may include, e.g., smart phones, smart watches, tablets, laptop computers, etc.) via a wired or wireless network 106, i.e., to send (e.g., "push") targeted messages to the mobile computing devices 104A-104C, to receive indications of targeted messages as presented by the mobile computing devices 104A-104C, to receive indications of user inputs and/or other responses to the targeted messages as presented by the computing devices 104A-104C. Although three mobile computing devices 104A-104C are shown in FIG. 1, the computing device 102 may communicate with any number of mobile computing devices 104A-104C in various embodiments.

In particular, each of the mobile computing devices 104A-104C may be configured to have different actual or simulated settings and/or characteristics. For example, each of the mobile computing devices 104A-104C may have different settings enabled. For instance, some of the mobile computing devices 104A-104C may be configured to access the internet via Wi-Fi, while other of the mobile computing devices 104A-104C may be configured to access the internet via a mobile telecommunications network. As another example, some of the mobile computing devices 104A-104C may be configured to operate in a power-saving mode, while other of the mobile computing devices 104A-104C may be configured to operate in a normal power use mode. As still another example, one of the mobile computing devices 104A-104C may be configured to operate its display screen with a higher screen brightness, while another of the mobile computing devices 104A-104C may be configured to operate its display screen with a lower screen brightness.

As another example, each of the mobile computing devices 104A-104C may be configured to have different simulated geographic locations (although the different mobile computing devices 104A-104C may actually be in the same geographic location). Moreover, each of the mobile computing devices 104A-104C may be configured to have different simulated or actual network connection statuses (e.g., stronger or weaker connections to a Wi-Fi or data network). Additionally, each of the mobile computing devices 104A-104C may be configured to have different simulated or actual battery charge levels (e.g., full charge, medium charge, low charge, etc.). Furthermore, each of the mobile computing devices 104A-104C may be configured to have different simulated or actual remaining memory storage (e.g., memory 100% full, memory 50% full, memory 5% full, etc.). Moreover, each of the mobile computing devices 104A-104C have different display screen sizes, display screen dimensions, or display screen resolutions. Additionally, each of the mobile computing devices 104A-104C may be devices made by different manufacturers, and/or may utilize different operating systems (or different versions of the same operating systems). Furthermore, each of the mobile computing devices 104A-104C may be configured with different actual or simulated user characteristics. For instance, applications installed on any of the mobile computing devices 104A-104C may, to the extent possible, be customized based on different user characteristics or demographics (e.g., age, gender, occupation, parent/child settings, account type, accessibility setting usage, etc.).

In some examples, the computing device 102 may additionally be configured to communicate with one or more cameras 108 via the wired or wireless network 106. For instance, the camera(s) 108 may be configured to capture images of the screens of the mobile computing devices 104A-104C when targeted messages are expected to be presented by each of the mobile computing devices 104A-104C and send the captured images to the computing device 102. Although the camera 108 is shown as external to the computing device 102 in FIG. 1, in some examples, the camera 108 may be incorporated within the computing device 102, or within another computing device configured to communicate with the computing device 102.

The computing device 102 may include one or more processors 110, such as one or more microprocessors, controllers, and/or any other suitable type of processor, and may further include a memory 112 (e.g., volatile memory, non-volatile memory) accessible by the one or more processors 110 (e.g., via a memory controller). The one or more processors 112 of the computing device 102 may interact with the memory 112 to obtain, for example, computer-readable instructions stored in the memory 112. The instructions stored in the memory 112 may include instructions for executing (i.e., emulating) a plurality of synthetic or virtual mobile computing devices 114A, 114B, 114C. Although three virtual mobile computing devices 114A-114C are shown in FIG. 1, the memory 112 of the computing device 102 (and/or other memories of other computing devices not shown) may be configured to execute any number of synthetic or virtual mobile computing devices 114A-114C. Moreover, as discussed above with respect to the physical mobile computing devices 104A-104C, each of the synthetic or virtual mobile computing devices 114A-114C may be configured to have different actual or simulated settings and/or characteristics.

Moreover, the instructions stored in the memory 112 may include instructions for performing various actions related to the techniques disclosed herein, e.g., including instructions for executing a targeted message application 116, which may include generating intended content and/or formats for targeted messages to be sent to various physical mobile computing devices 104A-104C and/or virtual mobile computing devices 114A-114C based on settings and/or characteristics of each of the mobile computing devices, sending the targeted messages to each of the physical mobile computing devices 104A-104C and/or virtual mobile computing devices 114A-114C to be presented, receiving indications of the content and/or format of the targeted messages as presented by each of the physical mobile computing devices 104A-104C and/or virtual mobile computing devices 114A-114C, comparing the content and/or format of the targeted messages as presented by each of the physical mobile computing devices 104A-104C and/or virtual mobile computing devices 114A-114C to the intended content and/or format of the targeted messages for each of the physical mobile computing devices 104A-104C and/or virtual mobile computing devices 114A-114C, and/or determining that errors have occurred for one or more of the physical mobile computing devices 104A-104C and/or virtual mobile computing devices 114A-114C based on discrepancies between the intended and actual content and/or format of targeted messages presented by one or more of the physical mobile computing devices 104A-104C and/or virtual mobile computing devices 114A-114C. In particular, the computer-readable instructions stored on the memory 112 of the computing device 102 may include instructions for carrying out any of the steps of the method 400 described in greater detail below with respect to FIG. 4.

Each of the physical mobile computing devices 104A-104C may include respective user interfaces 118A-118C. For instance, user interfaces 118A-118C may be configured to present targeted messages and/or other notifications (e.g., the targeted messages shown at FIGS. 2A-2B and 3A-3B below), and may be configured to receive input from users (e.g., including input involving users clicking on or otherwise engaging or interacting with targeted messages that are presented). Moreover, each of the mobile computing devices 104A-104C may include respective one or more processors 120A-120C, such as one or more microprocessors, controllers, and/or any other suitable type of processor, and may further include respective memories 122A-122C (e.g., volatile memory, non-volatile memory) accessible by the one or more processors 120A-120C (e.g., via a memory controller). The respective one or more processors 120A-120C of the mobile computing devices 104A-104C may interact with the respective memories 122A-122C to obtain, for example, computer-readable instructions stored in the memories 122A-122C. The instructions stored in the memories 122A-122C may include instructions for performing various actions related to the techniques disclosed herein, e.g., instructions for receiving targeted messages sent by the computing device 102, instructions for presenting targeted messages via the respective user interfaces 118A-118C, instructions for receiving user input related to the targeted messages via the respective user interfaces 118A-118C, instructions for sending indications of actual targeted messages as presented by the respective user interfaces 118A-118C to the computing device 102, and/or instructions for sending indications of user input related to the targeted messages to the computing device 102. In particular, the computer-readable instructions stored on the respective memories 122A-122C of each of the physical mobile computing devices 104A-104C may include instructions for carrying out any of the steps of the method 400 described in greater detail below with respect to FIG. 4.

FIGS. 2A and 2B illustrate an exemplary comparison of intended content for a targeted message for a particular mobile computing device and actual content of a targeted message as presented by the mobile computing device, in accordance with some embodiments. For instance, as shown in FIG. 2A, the intended content of a targeted message for a mobile computing device geographically located in Chicago may include an advertisement for a Chicago-specific restaurant, such as Lou Malnati's® pizza, displayed via the screen 202 of the mobile computing device as a notification 204A. In contrast, as shown in FIG. 2B, due to an error, the actual content of a notification 204B displayed via the screen 202 may include an advertisement for a west coast based restaurant that does not have locations in Chicago, such as In-N-Out Burger®. Consequently, the user of the mobile computing device geographically located in Chicago may be unlikely to click on or otherwise engage with the targeted message shown in FIG. 2B, including the advertisement for the restaurant that has no locations in the Chicago area. This may not be because the user has no interest in restaurant deals but because the content of the targeted message is unlikely to be relevant to the user.

FIGS. 3A and 3B illustrate an exemplary comparison of an intended format for a targeted message for a particular mobile computing device and the actual format of the targeted message as presented by the mobile computing device, in accordance with some embodiments. For instance, as shown in FIG. 3A, the intended format of a targeted message for a particular mobile computing device may include sizing and centering of a notification 304A displayed via the screen 302 of the mobile computing device that is appropriate for the size, orientation, and resolution of the screen 302 of the particular mobile computing device. In contrast, as shown in FIG. 3B, due to an error, the actual format of the targeted message as presented by the particular mobile computing device may include sizing and/or centering of the notification 304B that is inappropriate for the size and resolution of the screen 302 of the particular mobile computing device, i.e., such that the targeted message is only partially visible or otherwise is not clearly presented to the user. Consequently, the user of the mobile device of FIG. 3B may be unlikely to click on or otherwise engage with the targeted message shown in FIG. 3B, including the inappropriately formatted notification. This may not be because the user has no interest in the content of the targeted message but because the user is unable to clearly understand and/or interact with the targeted message due to its formatting on his or her particular mobile computing device.

FIG. 4 illustrates a flow diagram of an exemplary method 400 for using automated mobile computing device testing to ensure that a given targeted message is actually appearing in an intended manner for various types of intended recipients, in accordance with some embodiments. One or more steps of the method 400 may be implemented as a set of instructions stored on a computer-readable memory 112 and executable on one or more processors 110.

At block 402, targeted messages may be sent to a plurality of mobile computing devices for presentation via each of the plurality of mobile computing devices. In some examples, the mobile computing devices may be physical mobile computing devices, while in other examples the mobile computing devices may be synthetic mobile computing devices (e.g., virtual computing devices configured to represent physical mobile computing devices). Moreover, in some examples, the mobile computing devices may include a combination of physical mobile computing devices and synthetic mobile computing devices. In particular, the targeted messages may include intended content and/or intended formats based on characteristics associated with each (physical or synthetic) mobile computing device. For instance, these characteristics may include location characteristics, enabled setting characteristics, characteristics of a user of the mobile computing device, network connection status characteristics, battery power or charge characteristics, and/or operating system characteristics.

For example, a targeted message intended to be presented by mobile computing devices associated with a certain geographic location may include an advertisement or offer (or other information related to) a point of interest located near the geographic location. As another example, targeted messages intended to be presented by mobile computing devices with strong network connections, and/or by mobile computing devices using Wi-Fi as opposed to data, may include content or formatting that requires a larger file size and/or higher definition streaming, while targeted messages intended to be presented by mobile computing devices with poor network connections, and/or by mobile computing devices using data compared to Wi-Fi, may include content or formatting that requires smaller file size and/or lower definition streaming, or may include static images instead of videos. Similarly, targeted messages intended to be presented by mobile computing devices with full or otherwise high remaining battery power may include content or formatting that requires greater battery power to present (e.g., including a full video, a large number of images, and/or many interactive components), while targeted messages intended to be presented by mobile computing devices with lower remaining battery power (and/or mobile computing devices operating in a low-power mode) may include content or formatting that requires less battery power to present (e.g., a shortened version of a full video, fewer images, fewer or no interactive components, etc.). In other words, a "full version" of a targeted message may be intended to be presented by mobile computing devices with strong network connections and high remaining battery power, while a "reduced version" of the targeted message that is less taxing on the mobile computing device may be intended to be presented by mobile computing devices with weaker network connections and/or lower remaining battery power.

Additionally, targeted messages intended to be presented by mobile computing devices using a certain operating system or a certain version of the operating system may include content or formatting tailored or optimized for that operating system, while targeted messages intended to be presented by mobile computing devices using another operating system (or a different version of the same operating system) may include content or formatting that is instead tailored or optimized for the other operating system (or other version of the operating system). Similarly, targeted messages may be formatted to be centered within the screen size or screen aspect ratio of the mobile computing devices for which they are intended.

Moreover, targeted messages may include content and/or formatting intended to be appropriate for users associated with mobile computing devices based upon known user characteristics or demographics of users associated with the mobile computing devices (or mobile computing device application) via which they are intended to be presented. For example, a targeted message intended to be presented on a mobile computing device used by a child (i.e., to be presented by a mobile computing device with child lock settings enabled, or to be presented may via a mobile computing device application intended for use by children) may include child-appropriate content (e.g., targeted messages without curse words or adult themes, targeted messages including advertisements for toys, games, shows intended for children, etc.) or formatting (e.g., bright colors). As another example, a targeted message intended to be presented on a mobile computing device used by a military user may include content targeted for military users (e.g., including a military discount).

At block 404, an indication of the actual content and/or the actual format of the targeted message that is presented by each of the plurality of mobile computing devices may be received from each of the mobile computing devices. For instance, in some examples, one or more cameras may be configured to capture images of the screens of physical mobile computing devices when the targeted messages are presented by each physical mobile computing device, and the indication of the actual content and/or the actual format of the targeted message presented by the physical mobile computing devices may include or may be based on the captured images of the screens of the physical mobile computing devices. Moreover, in some examples, the indication of the actual content and/or the actual format of the targeted message as presented by each of the mobile computing devices may include a screen capture of the targeted message as presented by each of the plurality of mobile computing devices. Additionally, in some examples, the indication of the actual content and/or the actual format of the targeted message as presented by each of the plurality of mobile computing devices may include an indication of instructions being executed by each of the mobile computing devices at a time associated with the presenting of the targeted message by each of the plurality of mobile computing devices.

In some examples, the received indication of the actual content and/or the actual format of the targeted message that is presented by each of the plurality of mobile computing devices may include an indication of various characteristics or settings associated with each mobile computing device.

At block 406, the indication of the actual content and/or the actual format of the targeted message that is presented by each respective mobile computing device may be compared to the intended content and/or intended format of the targeted message for that mobile computing device based on the characteristics and/or settings associated with that mobile computing device, e.g., as discussed above with respect to FIGS. 2A-2B and FIGS. 3A-3B above. For example, comparing the indication of the actual content and/or the actual format of the targeted message that is presented by each respective mobile computing device to the intended content and/or intended format of the targeted message for that mobile computing device may include identifying any discrepancies between the actual content and/or format and the intended content and/or format.

For example, a discrepancy between the actual content and the intended content of a targeted message for a particular mobile computing device may exist when a targeted message that is presented by mobile computing devices associated with a certain geographic location includes an advertisement or offer for (or other information related to) a point of interest located nowhere near the geographic location. As another example, a discrepancy between the actual content and/or format and the intended content and/or format of a targeted message for a particular mobile computing device may exist when a mobile computing device with a poor network connection or low remaining battery charge attempts (and/or fails) to present a targeted message including content or formatting that requires a larger file size and/or higher definition streaming. In other words, such a discrepancy may exist when a higher-quality version of a targeted message is presented by a mobile computing device that is unable to stream or download the higher-quality version of the targeted message without depleting the mobile computing device's resources, or otherwise resulting in system lag or failure of the mobile computing device to fully present the targeted message. Similarly, a discrepancy between the actual content and/or format and the intended content and/or format of a targeted message for a particular mobile computing device may exist when a mobile computing device with a strong network connection and full or high remaining battery charge presents a targeted message including content or formatting that requires a smaller file size and/or lower definition streaming, or including static images instead of videos (i.e., when a lower-quality version of a targeted message is presented by a mobile computing device that is capable of presenting a higher-quality version of the targeted message without depleting system resources or resulting in lag).

Additionally, a discrepancy between the actual content and/or formatting and the intended content and/or formatting of a targeted message for a particular mobile computing device may exist when a targeted message that is presented by a given mobile computing device is tailored or optimized for an operating system (or operating system version) that is not running on the given mobile computing device, i.e., which may result in content and/or formatting issues when the mobile computing device's operating system attempts to present a targeted message tailored for a different operating system (or a different operating system version). Furthermore, a discrepancy between the actual formatting and the intended formatting of a targeted message for a particular mobile computing device may exist when a targeted message that is presented by a particular mobile computing device with a particular screen size, aspect ratio, or resolution is formatted for a mobile computing device with a different screen size, aspect ratio, or resolution, i.e., resulting in a presented targeted message that is too large or too small for the screen of the mobile computing device, off center on the screen of the mobile computing device, blurry on the screen of the mobile computing device, etc. As another example, a discrepancy between the actual content and the intended content of a targeted message for a particular mobile computing device may exist when a targeted message that is presented by a mobile computing device used by a child is inappropriate for children.

At block 408, an error associated with a targeted message presented by at least one of the mobile computing devices may be detected based on a discrepancy between the actual format and/or content of the targeted message and the intended content and/or the intended format of the targeted message. The error may be detected based upon any discrepancy between the intended or expected target message presentation and the actual observed presentation. Such discrepancies may include differences in content or differences in formatting. Such discrepancies may further include detecting a message presented at a mobile computing device not intended to receive such targeted message (e.g., a mobile computing device at a location or having parameters not matching the target message parameters). Thus, the presentation of a targeted message at a mobile computing device not intended to receive any targeted message may be identified as an error. Similarly, the detection of no message presentation during a time interval when a targeted message should have been presented at a mobile computing device matching the target message parameters may be detected as a discrepancy and error. In some embodiments, types of errors may be determined based upon corresponding types of discrepancies (e.g., message failure errors, unintended message presentation errors, content errors, or formatting errors), which error types may be used to further identify and/or correct the conditions that caused such errors (e.g., location data settings, conflicting settings, or incorrectly specified variables or other data errors).

At block 410, in some examples, the method 400 may further include automatically correcting the detected error associated with the targeted message based on the discrepancy between the intended content and/or the intended format of the targeted message to be presented by the at least one of the plurality of mobile computing devices and the actual content or the actual format presented by the at least one of the plurality of mobile computing devices. For instance, a specific type of content and/or formatting discrepancy may be identified for each mobile computing device associated with a discrepancy, and updated targeted messages may be generated for these mobile computing devices based on the specific type of content and/or formatting discrepancy. Such discrepancy type may be indicated by or determined based upon an error type determined as above, in some instances. The updated targeted messages may then be sent to the mobile computing devices at block 402 and the process may begin again, so that any remaining errors may be identified and corrected.

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, unless indicated otherwise, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may likewise be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, in some embodiments, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment or embodiments.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the description. This description, and the claims that follow, should be read to include one or at least one, and the singular also includes the plural unless the context clearly indicates otherwise.

Upon reading this disclosure, those of skill in the art will appreciate still additional alternative structural and functional designs for using automated mobile computing device testing to ensure that a given targeted message is actually appearing in an intended manner for various types of intended recipients. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A computer-implemented method, comprising:
   sending, by one or more processors, a message to be presented by a mobile computing device, wherein one or more of an intended content or an intended format of the message to be presented by the mobile computing device is based on one or more characteristics associated with the mobile computing device;
   receiving, by the one or more processors, an indication of one or more of the actual content or the actual format of the message as presented by the mobile computing device; and
   detecting, by the one or more processors, an error associated with the message presented by the mobile computing device based on comparing one or more of: (i) the actual content of the message as presented by the mobile computing device to the intended content of the message; or (ii) the actual format of the message as presented by the mobile computing device to the intended format of the message.

2. The computer-implemented method of claim 1, wherein the one or more characteristics associated with the mobile computing device include one or more of: location characteristics, enabled setting characteristics, characteristics of a user of the mobile computing device, network connection status characteristics, battery power or charge characteristics, or operating system characteristics.

3. The computer-implemented method of claim 1, wherein the mobile computing device is a synthetic mobile computing device configured to represent a physical mobile computing device having the characteristics represented by the synthetic mobile computing device.

4. The computer-implemented method of claim 1, wherein the mobile computing device is a physical mobile computing device.

5. The computer-implemented method of claim 4, further comprising:
   capturing, by one or more cameras, at a time associated with the presenting of the message, an image of a screen of the physical mobile computing device; and
   wherein the indication of the actual content and the actual format of the message as presented by the mobile computing device includes the image of the screen of the physical mobile computing device captured at the time associated with the presenting of the message.

6. The computer-implemented method of claim 1, wherein the indication of the actual content and the actual format of the message as presented by the mobile computing device includes a screen capture of the message as presented by the mobile computing device.

7. The computer-implemented method of claim 1, wherein the indication of the actual content and the actual format of the message as presented by the mobile computing device includes an indication of instructions being executed by the mobile computing device at a time associated with the presenting of the message by the mobile computing device.

8. The computer-implemented method of claim 1, further comprising:
   automatically correcting, by the one or more processors, the detected error associated with the message presented by the mobile computing device based on a discrepancy between the intended content or the intended format of the message to be presented by the mobile computing device and the actual content or the actual format presented by the mobile computing device.

9. A system, comprising:
   one or more processors; and
   a non-transitory program memory communicatively coupled to the one or more processors and storing executable instructions that, when executed by the one or more processors, cause the processors to:

send a message to be presented by a mobile computing device, wherein one or more of an intended content or an intended format of the message to be presented by the mobile computing device is based on one or more characteristics associated with the mobile computing device;

receive an indication of one or more of the actual content or the actual format of the message as presented by the mobile computing device; and detect an error associated with the message presented by the mobile computing device based on comparing one or more of: (i) the actual content of the message as presented by the mobile computing device to the intended content of the message; or (ii) the actual format of the message as presented by the mobile computing device to the intended format of the message.

10. The system of claim 9, wherein the one or more characteristics associated with the mobile computing device include one or more of: location characteristics, enabled setting characteristics, characteristics of a user of the mobile computing device, network connection status characteristics, battery power or charge characteristics, or operating system characteristics.

11. The system of claim 9, wherein the mobile computing device is a synthetic mobile computing devices configured to represent a physical mobile computing device having the characteristics represented by the synthetic mobile computing device.

12. The system of claim 9, wherein the mobile computing device is a physical mobile computing device.

13. The system of claim 12, wherein the executable instructions, when executed by the one or more processors, further cause the processors to:

capture, at a time associated with the presenting of the message, an image of the screen of the physical mobile computing device; and wherein the indication of the actual content and the actual format of the message as presented by the mobile computing device includes the image of the screen of the physical mobile computing device captured at the time associated with the presenting of the message.

14. The system of claim 9, wherein the indication of the actual content and the actual format of the message as presented by the mobile computing device includes a screen capture of the message as presented by the mobile computing device.

15. The system of claim 9, wherein the indication of the actual content and the actual format of the message as presented by the mobile computing device includes an indication of instructions being executed by the mobile computing device at a time associated with the presenting of the message by the mobile computing device.

16. The system of claim 9, wherein the executable instructions, when executed by the one or more processors, further cause the processors to:

automatically correct the detected error associated with the message presented by the mobile computing device based on a discrepancy between the intended content or the intended format of the message to be presented by the mobile computing device and the actual content or the actual format presented by the mobile computing device.

17. A non-transitory computer readable storage medium storing computer-readable instructions that, when executed by one or more processors, cause the one or more processors to:

send a message to be presented by a mobile computing device, wherein one or more of an intended content or an intended format of the message to be presented by the mobile computing device is based on one or more characteristics associated with the mobile computing device;

receive an indication of one or more of the actual content or the actual format of the message as presented by the mobile computing device; and detect an error associated with the message presented by the mobile computing device based on comparing one or more of: (i) the actual content of the message as presented by the mobile computing device to the intended content of the message; or (ii) the actual format of the message as presented by the mobile computing device to the intended format of the message.

18. The non-transitory computer readable storage medium of claim 17, wherein the one or more characteristics associated with the mobile computing device include one or more of: location characteristics, enabled setting characteristics, characteristics of a user of the mobile computing device, network connection status characteristics, battery power or charge characteristics, or operating system characteristics.

19. The non-transitory computer readable storage medium of claim 17, wherein the indication of the actual content and the actual format of the message as presented by the mobile computing device includes a screen capture of the message as presented by the mobile computing device.

20. The non-transitory computer readable storage medium of claim 17, wherein the executable instructions, when executed by the one or more processors, further cause the processors to: automatically correct the detected error associated with the message presented by the mobile computing device based on a discrepancy between the intended content or the intended format of the message to be presented by the mobile computing device and the actual content or the actual format presented by the mobile computing device.

* * * * *